US006433448B1

(12) United States Patent
Hatton

(10) Patent No.: US 6,433,448 B1
(45) Date of Patent: Aug. 13, 2002

(54) INTEGRATED TORQUE MOTOR AND THROTTLE BODY

(75) Inventor: Bruce M. Hatton, Lake Orion, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/528,775

(22) Filed: Mar. 17, 2000

Related U.S. Application Data

(63) Continuation-in-part of application No. 09/193,676, filed on Nov. 17, 1998.

(51) Int. Cl.[7] .............................. H02K 5/00; H02K 7/00
(52) U.S. Cl. ...................... 310/67 R; 310/43; 310/45; 310/89; 310/156.01; 310/217; 310/254; 310/266; 123/339.25; 251/129.11
(58) Field of Search ..................... 251/129.11, 129.01, 251/71; 310/43, 45, 42, 254, 89, 217, 156.01, 266; 123/339.25

(56) References Cited

U.S. PATENT DOCUMENTS

| | | | | |
|---|---|---|---|---|
| 3,601,507 A | * | 8/1971 | Harris | 417/354 |
| 3,631,272 A | * | 12/1971 | Kirii | 310/10 |
| 3,919,572 A | * | 11/1975 | Desy | 310/45 |
| 4,118,648 A | * | 10/1978 | Gillet et al. | 310/269 |
| 4,311,933 A | | 1/1982 | Riggs et al. | 310/156 |
| 4,336,470 A | * | 6/1982 | Gutris | 310/42 |
| 4,409,940 A | | 10/1983 | Gaus | 123/361 |
| 4,915,074 A | * | 4/1990 | Arai | 123/399 |
| 5,005,545 A | | 4/1991 | Wendel et al. | 123/337 |
| 5,239,961 A | * | 8/1993 | Neidhard et al. | 123/339 |
| 5,705,874 A | * | 1/1998 | Gruedl | 310/216 |
| 5,777,412 A | * | 7/1998 | Yamamoto | 310/83 |
| 5,826,553 A | | 10/1998 | Nakayama et al. | 123/184.42 |
| 5,912,538 A | * | 6/1999 | Turner | 310/280 |
| 6,043,583 A | * | 3/2000 | Kurosawa et al. | 310/254 |
| 6,065,946 A | * | 5/2000 | Lathrop | 417/423.14 |

FOREIGN PATENT DOCUMENTS

| | | | | |
|---|---|---|---|---|
| DE | 3905655 A1 | 8/1990 | | F02D/9/02 |
| JP | 61229308 | 10/1986 | | H01F/7/08 |

* cited by examiner

Primary Examiner—Burton S. Mullins
(74) Attorney, Agent, or Firm—Daniel S. Kalka; Roger A. Johnston

(57) ABSTRACT

An electrically operated throttle valve assembly 110, 210 having a throttle shaft 18, 218 with a portion extending exteriorly of the throttle body 12. Rotor 166, 266 is mounted on the extending portion of shaft 18, 218. A housing 80 concentrically surrounds the rotor 166, 266 and includes a rear wall 86, 286 to which stator 134, 234 is attached. The stator 134, 234 having a plurality of circumferentially spaced pole segments each with a coil is mounted to the rear wall 86, 286 and is concentrically disposed within the rotor 166, 266. The hollow cylindrical rotor 166, 266 with plural magnets 72, 74, 272, 274 disposed about the inner periphery has a radial web flange 168, 268 which is drivingly attached to one end of the extending portion of shaft 18, 218 with the rotor 166, 266 nested over the stator pole segments. Reducing the size or even eliminating the mounting shaft or bolt 92, and preferably replacing it with a welded, wound and overmolded stack of laminations provides more winding area for electrically conductive coils to provide more magnetic flux.

7 Claims, 6 Drawing Sheets

INTEGRATED TORQUE MOTOR AND THROTTLE BODY

CROSS-REFERENCE TO RELATED APPLICATIONS

This patent application is a continuation-in-part application of parent application Ser. No. 09/193,676, filed on Nov. 17, 1998.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates generally to air inlet or throttle valves, and particularly to throttle valves of the butterfly type utilized for controlling air inlet flow to an internal combustion engine.

2. Description of the Related Art

In recent times, with the advent of onboard microprocessor controllers for vehicle engines, it has been desired to provide electrically operated control of the vehicle engine throttle in order to more fully utilize the sophistication of the programs contained within the microprocessor for engine fuel delivery and ignition timing control in order to minimize fuel consumption and reduce exhaust emissions. It has also been desired to integrate the throttle control with the onboard engine microcomputer as an adjunct or override for vehicle operator throttle pedal movement. It has further been desired to provide an electrically operated throttle in order to implement the cruise control function and traction control function with the algorithms programmed into the engine control computer.

Heretofore, it has been proposed to provide an electric motor mounted on the vehicle throttle body to provide throttle valve rotation in response to an electric control signal provided by the vehicle engine computer. However, it has proven difficult to mount an electric motor on a vehicle throttle body and provide proper calibration of the motor for precise positioning and rotation of the throttle after mounting of the motor on the throttle body.

Heretofore, it has been proposed to provide stepper motors and relatively high rotations per minute (rpm) low torque servomotors connected through a speed reducing gear train to provide electrical actuation of the vehicle throttle. However, stepper motors can be prohibitively costly for high volume automotive applications; and, servomotors driving the throttle through a gear train can be difficult to calibrate and can lag in providing the necessary response time required for vehicle throttle operation. It has also been proposed to use a torque motor for direct throttle rotation. However, torque motors can be prohibitively heavy and bulky in order to provide adequate torque for desired throttle response. Torque motors can also be difficult to assemble on the throttle body and calibrate for proper throttle positioning. Furthermore, torque motors can require installation and precise calibration (i.e., rotary orientation) of the motor stator and rotor poles with respect to the throttle plate before assembly of the throttle body to the engine intake manifold. However, when it is desired to fabricate the throttle body and engine intake manifold as a single one-piece member, all motor actuators can be quite difficult to assemble and calibrate on such an arrangement.

U.S. patent application Ser. No. 09/098,974 titled Electrically Operated Throttle Valve Assembly, assigned to the Assignee of the present invention and hereby incorporated by reference, describes a throttle valve assembly design where the rotor is supported by the throttle valve shaft. In this design, the shaft 18 extends outward beyond its support bearing by the length of the motor as best seen in FIG. 1.

There still exists a need for an improved design that can reduce the bending moment produced by shaft 18 and mount stator 34 without fasteners positioned in the magnetically critical pole outer diameter (O.D.) area therein.

Still, it is desirable to provide a relatively low cost, lightweight, motorized throttle for a motor vehicle engine which is simple to fabricate, fast in response, lightweight, and requires little or no calibration upon installation.

BRIEF SUMMARY OF THE INVENTION

Accordingly, one object of the present invention is directed to reducing the bending moment of the throttle shaft, i.e., reducing displacements during vibrations.

Another object of the present invention is to shorten the throttle shaft to increase the stiffness of the rotor assembly. This allows for a slightly smaller magnetic air gap and results in improved magnetic efficiency. Shortening the shaft reduces the inertia due to the shaft which results in improved response time.

A further object of the present invention is to reduce or even eliminate attachment bolts from the magnetically critical pole area of the stator assembly.

Still a further object of the present invention is to provide a torque motor assembly design that allows for more winding area in the laminates for a given motor size by providing an increase in the slot area available for winding magnet wire around each pole of the stator. This can result in a smaller motor for the same torque.

Still a further object of the present invention is to provide a torque motor assembly design that allows for more magnetic flux for a given motor size.

The present invention provides an improved torque motor assembly design constructed preferably integrally with a throttle body and valve with the motor having a rotor attached to an extending portion of the throttle shaft. Preferably a portion of the throttle shaft extends exteriorly of the throttle body with the motor rotor configured as a hollow cylinder and mounted on the shaft and nested concentrically over the stator. The preferred embodiment of the present invention eliminates the mounting bolt(s) for the attachment of metal laminations to the stator assembly, and replaces that design with a welded, wound, and overmolded stack of laminations. The present invention provides a design with an increase in the slot area available for winding magnet or electrically conductive wire around each pole of the stator. In an alternate embodiment of the present invention, a second shaft is provided substantially centrally through the stator in a less magnetically critical area, i.e., the inner diameter (ID). The second shaft is preferably a through-bolt smaller in diameter than the throttle shaft. The second shaft is rigidly attached to a housing that concentrically surrounds the stator and rotor.

The various features of novelty which characterize the present invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of this invention is illustrated.

DETAILED DESCRIPTION OF THE INVENTION

Figure 1:
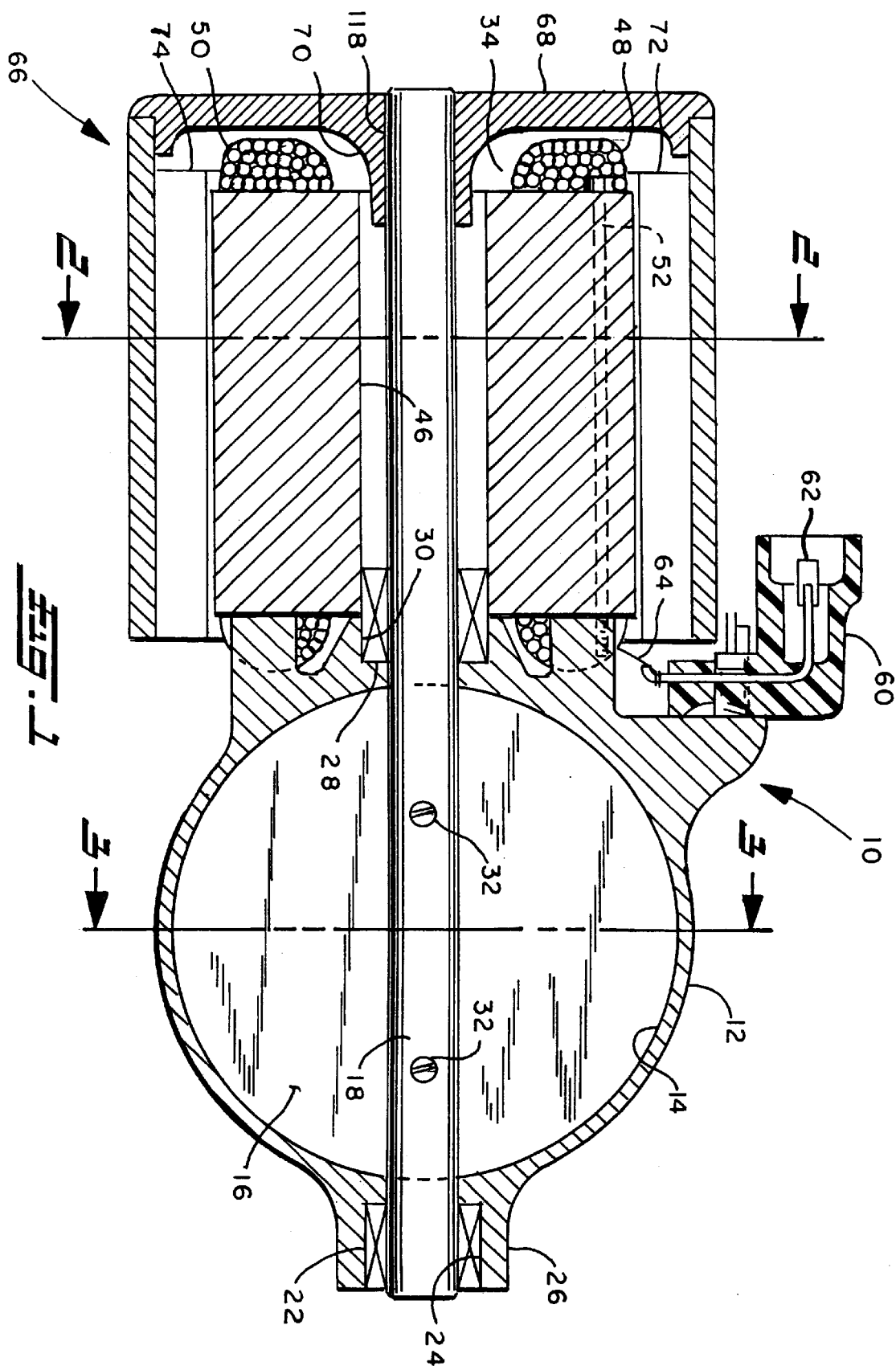
FIG. 1 is a section view taken transversely through the air inlet passage of one embodiment of a vehicle throttle body.
Figure 3:
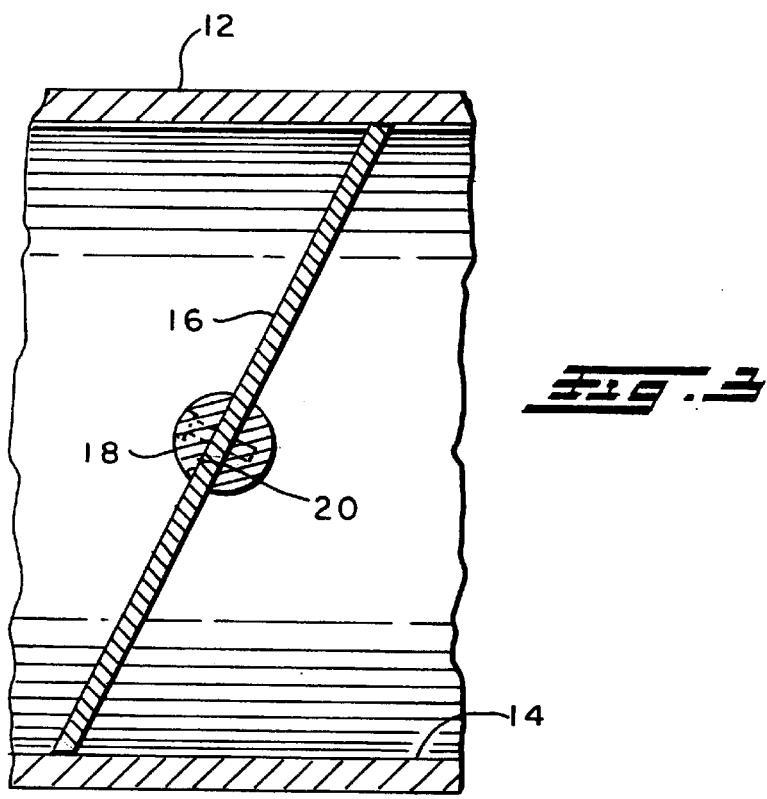
FIG. 3 is a section view taken along section indicating lines 3—3 of FIG. 1.

Referring first to FIGS. 1 and 3, a throttle valve assembly is indicated generally at 10 and includes a throttle body structure 12 having formed therethrough an air inlet passage 14 which has disposed therein a rotatable valve member or butterfly plate 16. The valve member 16 is received through a slot 20 formed in a shaft 18 which has one end journalled in a bearing 22 disposed in a recess 24 formed in a boss 26 provided on the body 12. The throttle plate 16 is secured in the slot 20 by a pair of screws 32 received through the shaft 18. Shaft 18 extends through the side of passage 14 opposite boss 26 and is journalled in a second bearing 28 provided in a recess 30 formed in the throttle body exteriorly of air inlet passage 14. In the presently preferred practice of the invention, shaft 18 and its external segment 118 are formed as a one-piece unitary member.

Shaft 18 extends externally beyond bearing 28 in an external segment 118.

A stator indicated generally at 34 has a pair of oppositely disposed semi-cylindrical pole segments or shoes 36, 38 which are disposed in diametrically opposite spaced substantially parallel arrangement. Each of the segments 36, 38 is supported by a longitudinal web denoted respectively 40, 42 attached to a central hub 44 which has a clearance passage or bore 46 formed therethrough and through which is received shaft extension 118.

Each of the webs 40, 42 has a coil wound thereabout denoted respectively 48, 50 and which is formed preferably of magnet wire. The stator 34 is secured to the throttle body preferably by through-bolting with screws or bolts 52, 54, 56, 58 disposed peripherally about the stator and threadedly engaging the throttle body 12. Alternatively stator 34 may be secured by other techniques, such as, for example, providing lugs thereon which are engaged by clips or mounting brackets. Thus, the stator 34 extends in cantilever from throttle body 12 over the shaft external segment 118.

An electrical receptacle 60 is provided on the throttle body 12 and has electrical terminals provided therein, one of which is illustrated and denoted by reference numeral 62 and which is connected to one of the leads 64 of coil 48 and is typical of the coil connections.

Figure 2:
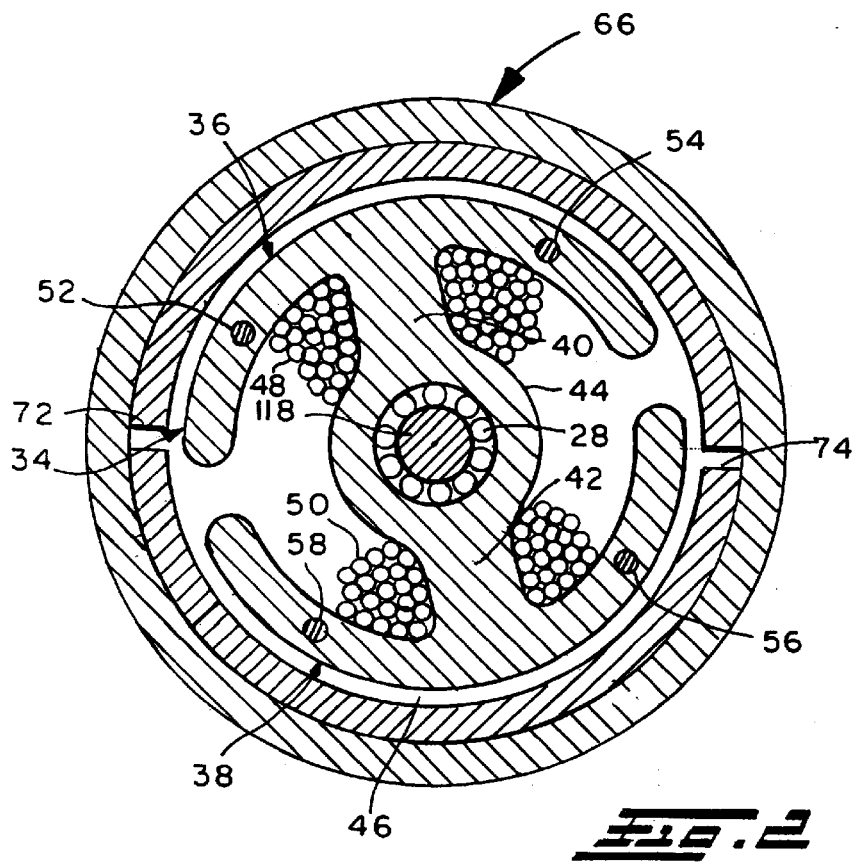
FIG. 2 is a section view taken along section indicating lines 2—2 of FIG. 1.

Still referring to FIGS. 1 and 2, a rotor indicated generally at 66 has a generally hollow cylindrical configuration and is formed of a material with high magnetic permeability. Rotor 66 is disposed over the stator 34 and is supported by an annular web flange 68 having a hub 70 secured onto the end of shaft extension 118 preferably by press fit engagement. However, it will be understood that the hub 70 may alternatively be positively engaged with shaft extension 118 by any suitable expedient such as a spline fitting, shaft key or weldment.

Rotor 66 has a plurality of permanent magnets 72, 74 each having a preferably semi-cylindrical configuration disposed about the inner periphery of the rotor in circumferentially spaced arrangement to define therebetween a pair of diametrically opposite disposed air gaps. If desired, rotor 66 may be formed integrally as for example by deep drawing or extrusion. In the present practice, the rotor is formed of a straight tubular section 76 attached to a flange member 68 by suitable means such as fasteners, weldment, metal deformation, or the like.

Figure 4:
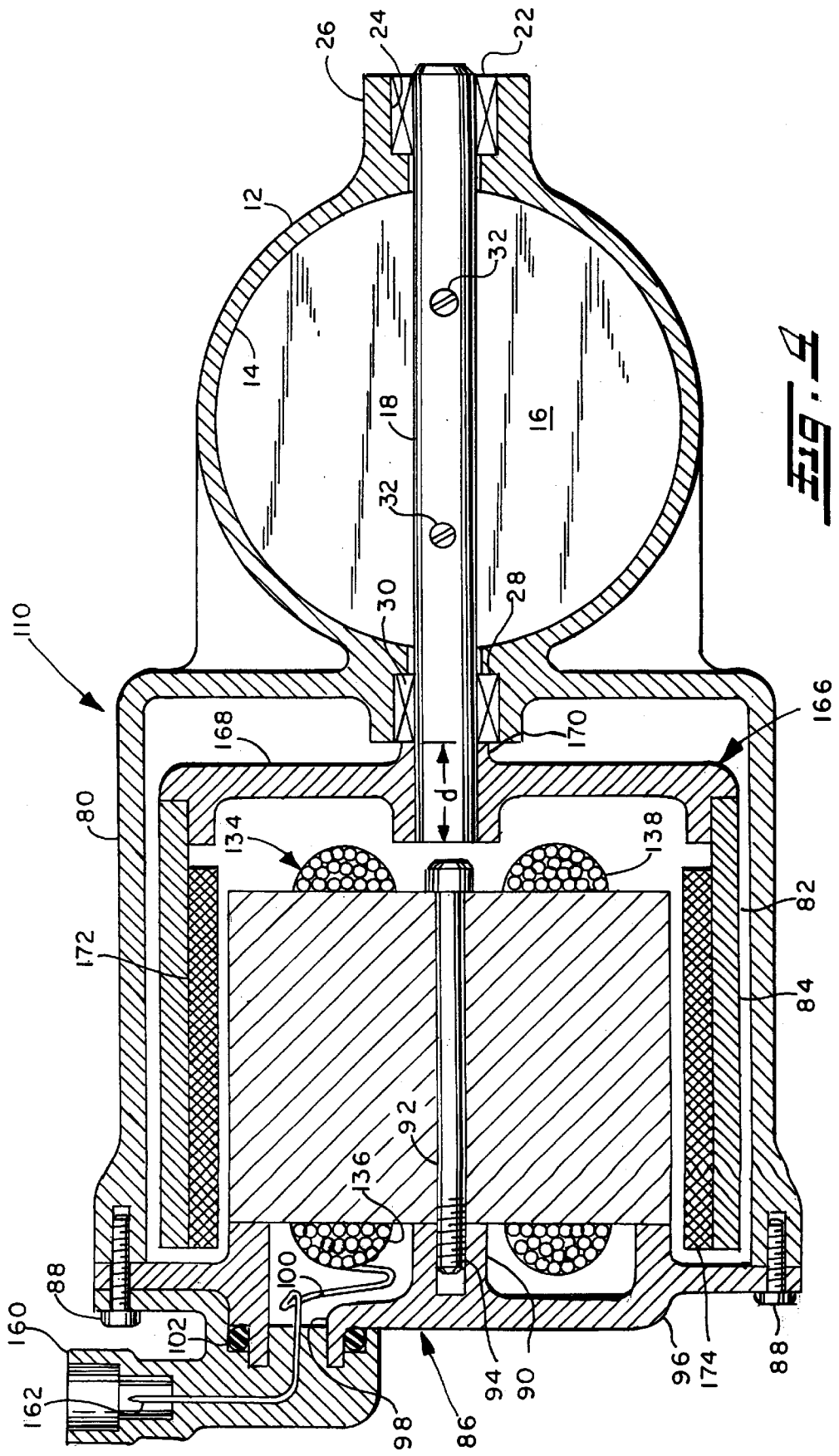
FIG. 4 is a section view similar to FIG. 1 in accordance with one embodiment of the present invention.

Referring now to FIG. 4, where like numerals indicate like or similar features, there is shown a sectional view of an improved throttle valve assembly generally designated 110 according to the present invention. Throttle valve assembly 110 includes a throttle body 12 with an air inlet passage 14 and a rotatable valve member 16 disposed therein. Valve member 16 is received through a slot 20 (as seen in FIG. 3) formed in shaft 18 and is secured thereto with suitable fasteners 32. Shaft 18 has one end journalled in a bearing 22 disposed in recess 24 formed in the boss 26. In the present invention, shaft 18 only extends through the side of passage 14 opposite boss 26 a sufficient distance to allow for mounting the rotor 166 thereon.

Preferably, a generally cylindrical housing 80 is connected to the throttle body 12 at the recess 30. Housing 80 may be attached to throttle body 12, or more preferably is integrally formed therewith. Housing 80 concentrically receives the rotor 166 therein and provides a gap 82 that allows the rotor 166 to rotate therein.

Rotor 166 has a generally hollow cylindrical configuration and is made from a material with high magnetic permeability. In this embodiment, rotor 166 is constructed with a tubular section 84 which is attached by suitable means at one end to the web flange 168. Flange 168 includes a centrally located hub 170 with a bore that receives the extending portion of shaft 18 for mounting rotor 166 thereon by way of a press fit engagement, spline fitting, shaft key, weldment or the like for positive engagement. Rotor 166 further includes a plurality of permanent magnets 172, 174 for a 2-pole, or with four magnets for a 4-pole configuration. Each magnet 172, 174 preferably has a semi-cylindrical configuration disposed about the inner periphery of the tubular section 86 of rotor 166 in a circumferentially spaced arrangement to define therebetween a pair of diametrically oppositely disposed air gaps. Rotor 166 alternatively may be formed integrally as, for example, by deep drawing or possibly extrusion.

A rear wall or cover 86 is attached to the open end of housing 80 with any suitable means like fasteners 88, for example. Rear wall 86 has a centrally located hub 90 with preferably a threaded bore 94 constructed to receive a threaded end of a second shaft 92, e.g. preferably a bolt.

The second shaft 92 extends through stator 134 in substantial axial alignment with shaft 18 and securely holds the stator in a concentric orientation within rotor 166. Advantageously, the present invention allows for the placement of second shaft 92 in a less magnetically critical area of the stator, i.e., substantially centrally positioned within stator 134. Rear wall 86 in the preferred embodiment includes at least two recesses 96 for a 2-pole configuration and may contain four recesses for a 4-pole configuration, each recess 96 accommodating one of the pole segments 136, 138 of stator 134. An opening 98 with a boss portion in the rear wall 86 receives one of the leads 100 from the coil which is typical of coil connections. Lead 100 is electrically connected to an electric terminal 162 positioned in an electrical receptacle 160 situated in opening 98. Ordinarily, the motor would require two terminals 162, but only one is shown. An O-ring 102 is employed to provide a seal around opening 98. Stator 134 can still be constructed of like materials and in a like manner to that of stator 34. In contrast to other designs, second shaft 92 eliminates the need for supporting rotor 66 in FIG. 1 with the longer shaft 18, 118. The shorter shaft 18 in FIG. 4 increases the stiffness of the rotor assembly and reduces displacements during vibrations. This allows for a slightly smaller magnetic air gap due to smaller safety margins and the resulting improved magnetic efficiency. By employing second shaft 92 to allow for a shorter shaft 18, the throttle valve assembly 110 produces a smaller moment of inertia resulting in improved response time.

By providing a shorter shaft 18 in throttle valve assembly 110, the clearance normally provided in the laminates of stator 34 are not required in stator 134. Thus, the four laminate attachment bolts 52, 54, 56, 58 used in the design shown in FIG. 1 are eliminated. Those attachment bolts 52, 54, 56, 58 are situated in a magnetically critical area of the stator 34. By replacing these bolts with a single bolt 92 or similar mounting means including, without limitation, a pressed pin connection, rivet through rear wall, welding, or the like in a less magnetically critical area, the design of the throttle valve assembly 110 of the present invention allows for more winding area in the laminates. This feature allows a smaller motor to be constructed for the same torque resulting in weight and cost savings.

Figure 5:
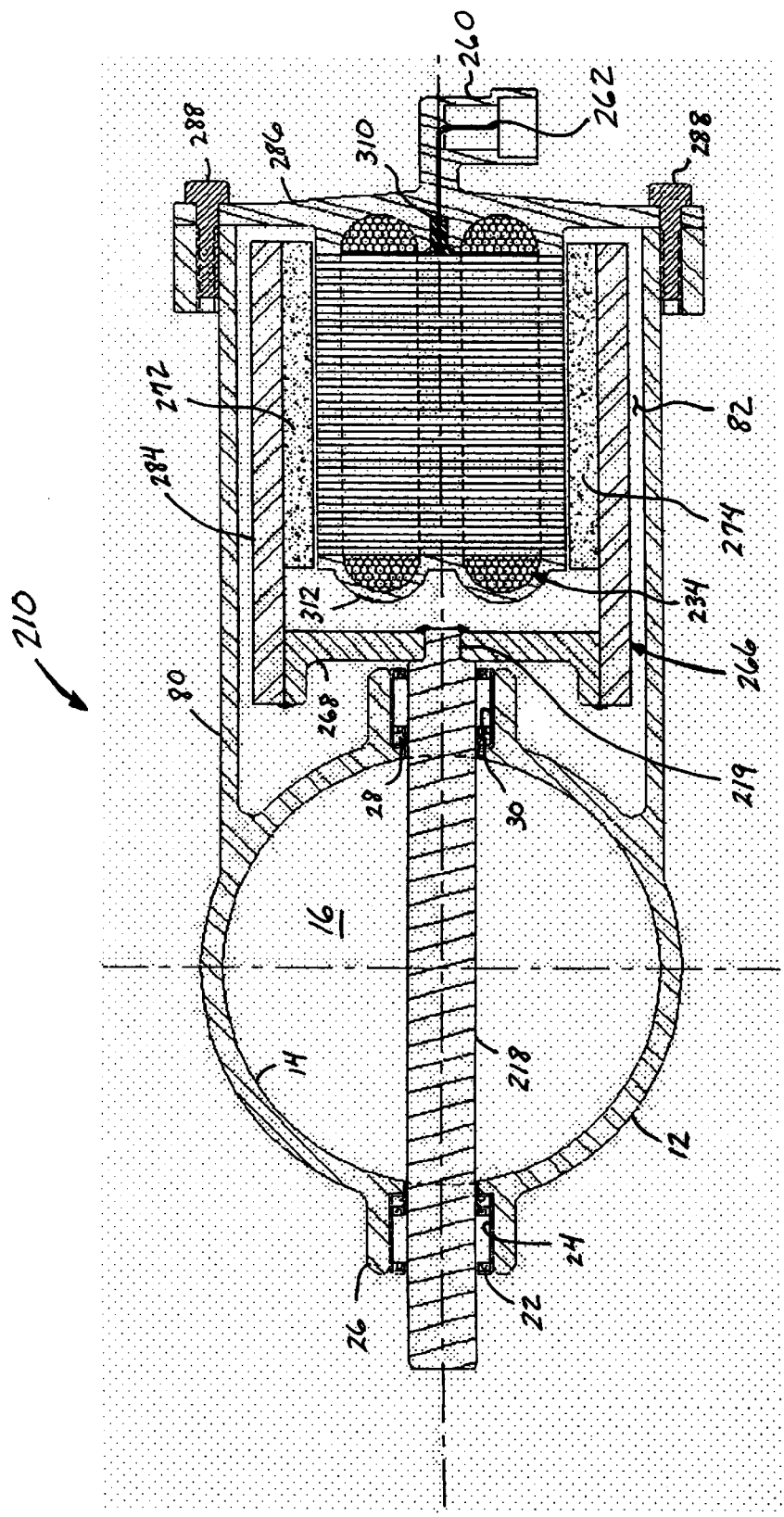
FIG. 5 is a section view similar to FIG. 1 in accordance with a preferred embodiment of the present invention.

Next, referring now to FIG. 5, where like numerals indicate like or similar features, there is shown a sectional view of an improved throttle valve assembly generally designated 210 according to the present invention. Throttle valve assembly 210 includes a throttle body 12 with an air inlet passage 14 and a rotatable valve member 16 disposed therein. Valve member 16 is received through a slot in shaft 218 similar to that of slot 20 (as seen in FIG. 3) formed in shaft 18 and may be secured thereto with suitable fasteners. Shaft 218 has one end journalled in a bearing 22 disposed in recess 24 formed in the boss 26. In the present invention, shaft 218 only extends through the side of passage 14 opposite boss 26 a sufficient distance to allow for mounting the rotor 266 thereon similar to the embodiment shown in FIG. 4. Also, preferably shaft 218 has a portion 219 with a smaller or reduced diameter upon which rotor 266 is disposed.

Preferably, a generally cylindrical housing 80 is connected to the throttle body 12. Housing 80 may be attached to throttle body 12, or more preferably is integrally formed therewith. Housing 80 concentrically receives the rotor 266 therein and provides a gap 82 that allows the rotor 266 to rotate therein.

Rotor 266 has a generally hollow cylindrical configuration and is made from a material with high magnetic permeability. In this embodiment, rotor 266 is constructed with a tubular section 284 which may be integral with or attached by suitable means at one end to the web flange 268. Flange 268 includes a centrally located bore that receives the reduced diameter portion of shaft 218 for mounting rotor 266 thereon by way of a press fit engagement, spline fitting, shaft key, weldment or the like, for positive engagement. Rotor 266 further includes a plurality of permanent magnets 272, 274 for a 2-pole or with four magnets for a 4-pole configuration. Each magnet 272, 274 preferably has a semi-cylindrical configuration disposed about the inner periphery of the tubular section 284 of rotor 266 in a circumferentially spaced arrangement to define therebetween a pair of diametrically oppositely disposed air gaps. Rotor 266 alternatively may be formed integrally as, for example, by deep drawing or possibly extrusion.

Figure 6:
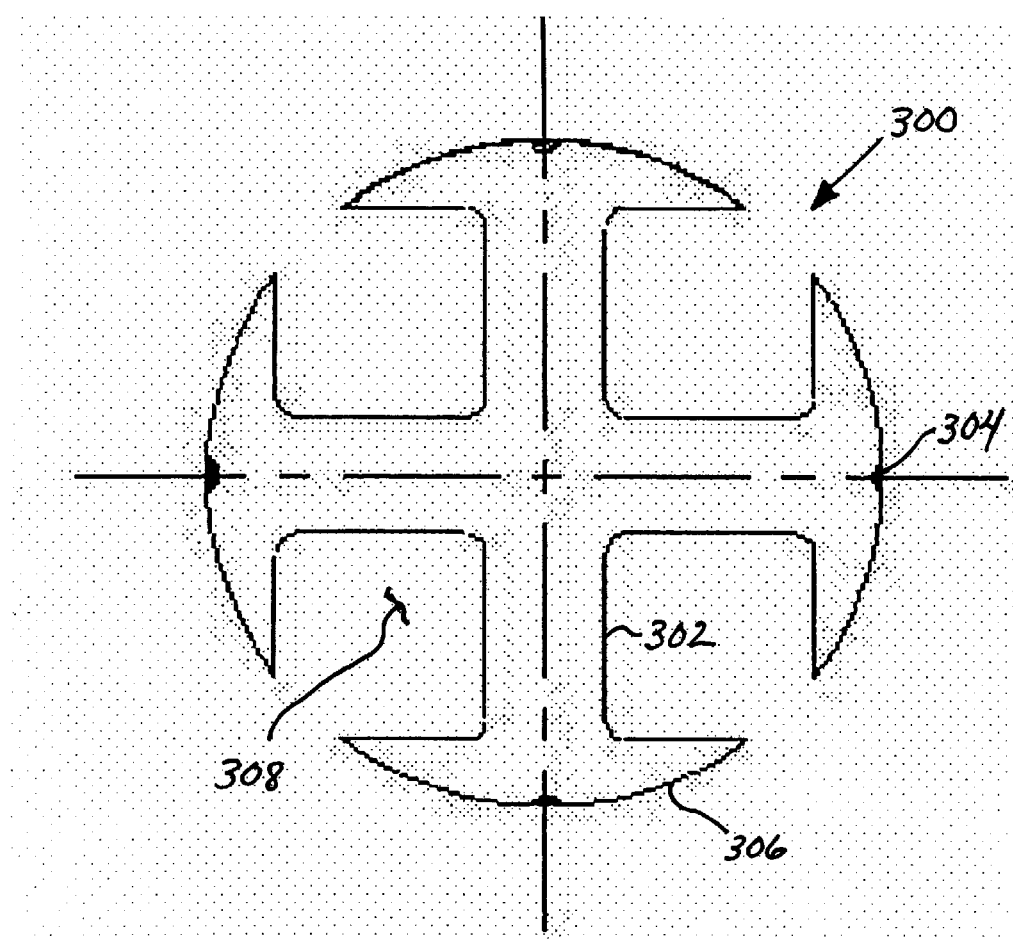
FIG. 6 is section view of a 4-pole stator design without a shaft therethrough.

The preferred embodiment of the present invention advantageously employs a plurality of laminations, also referred to as laminates or metal plates, 300 each having discrete pole segments 302, for example with a shape as seen in FIG. 6 for a 4-pole design. A 2-pole design is an alternative and would simply have two less poles 302. The plurality of metal plates 300 are preferably steel and are about 2 mm. thick. It should be immediately apparent that other metals and thicknesses are also suitable. The plurality of laminations or metal plates 300 are stacked and welded together on an outer surface of the pole segment 302, for example, with a weld bead along an apex 304 of the arc 306 on each of the pole segments 302. This welding location is intended for the preferred embodiment. Other locations for welding may also be employed. Approximately fifty or more metal plates 300 which are preferably formed from a metal stamping process are stacked in a fixture and welded together with a weld bead extending on the outside surface or diameter as previously mentioned. The poles 302 and winding cavities or slot area 308 formed thereby are preferably coated with an epoxy coating or an electrostatic paint as is known in this art. A terminal interface connector 310 (as seen in FIG. 5) is disposed in position so that after winding the electrically conductive coils (magnetic wire) on the poles of the stator 234 (formed by the plurality of laminations 300 welded together) the wires of the coils are connected to terminal connections therein and terminate at the electrical terminals 262. The terminals 262, only one of which is shown in FIG. 5, pass through the electrical receptacle 260 through the terminal interface connector 310, which is made from a non-conductive material, and connect to their respective isolated terminal connections therein to the leads of the coils. The present invention encapsulates the coils of the stator 234 with a plastic material 312, like glass filled nylon, using a plastic injection molding process. Rear wall 286 is preferably formed integrally therewith at the same time during the plastic injection molding process.

By eliminating the mounting bolt 92 for the attachment of the metal laminations to the stator assembly, and replacing it with a welded, wound, and overmolded stack of laminations, the preferred construction and design of the present invention increases the winding cavity area for winding electrically conductive coils around each pole of the stator. This allows for more magnetic flux for a given motor size. Likewise, if available flux is not the limiting factor in the motor design, but flux carrying capacity of the lamination stack is, then the winding area dimensions can be adjustable to trade winding area for metal area. This allows for flexibility in the design to position more metal where necessary for carrying the flux.

In operation, excitation of coils in the stator 134, 234 by current flow in one direction will cause rotor 166, 266 to rotate by an amount of about 160 degrees in one direction for a 2-pole design (about 80° for a 4-pole design). By reversing polarity, energization of the coils produces current flow in an opposite direction which causes the rotor to rotate an equivalent distance in the opposite direction.

The throttle valve 110, 210 according to the present invention allows for several advantages in assembly including, without limit, the following. The design of the instant invention provides a drop-in feature for rotor 166, 266 into housing 80. Then, stator 134, 234 is inserted therein. Rear wall 86, 286 seals the throttle valve assembly providing protection from dust, dirt, water, snow, or the like, i.e., environmental protection in a fairly hostile environment. The assembly process of the throttle valve 110, 210 is also cost effective and provides similar benefits.

The present invention requires no electrical connections during final assembly since the stator 134, 234 has all of its connections completed prior to placement within rotor 166, 266.

The design of the present invention allows for the integration of additional functions like position sensing, for example, into the stator subassembly and use of its electrical connector.

In view of the foregoing, the throttle valve assembly 110, 210 offers the following advantages: low shaft bending, increased winding area, low rotor inertia, and an improved assembly technique. The removable rear wall 86 allows assembly of the stator 134 thereon prior to fastening wall 86 onto housing 80. This facilitates alignment and spacing.

Figure 7:
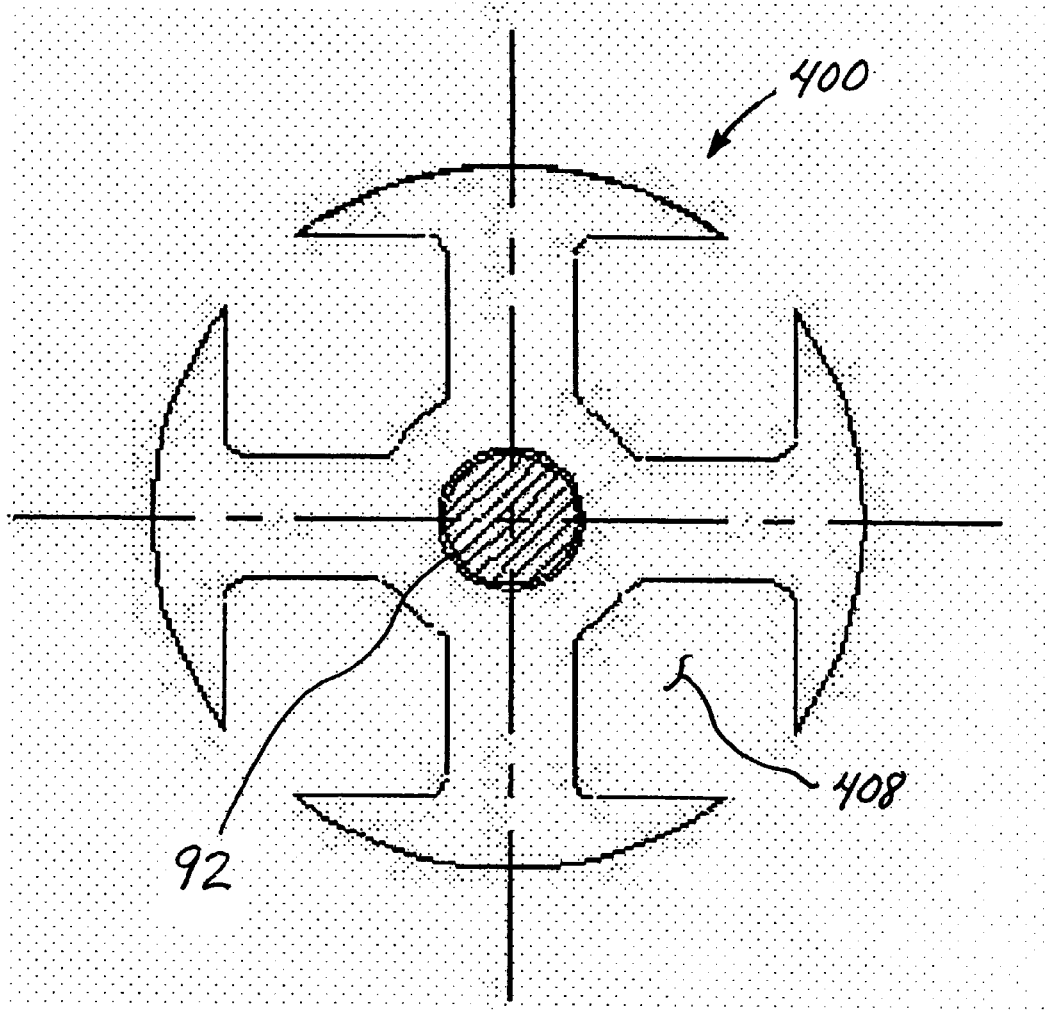
FIG. 7 is a section view of a 4-pole stator design with a shaft therethrough.

The throttle assembly 210 employs a welded and overmolded lamination stack 300 that provides more winding area, approximately four percent more area as shown and calculated between FIGS. 6 and 7, compared to a bolted together lamination stack 400. By completely eliminating the mounting bolt 92 for the attachment of the metal laminations to the stator assembly, and replacing it with a welded, wound and overmolded stack of laminations, an improved design is constructed that allows for an increase in slot area or winding cavity area 308 as compared with the winding cavity area 408 for winding electrically conductive coils around each pole of the stator. The construction of throttle assembly 210 allows for more magnetic flux for a given motor size. If flux is not the limiting factor in the motor design, but flux carrying capacity is, then the slot area dimensions can be adjusted to trade winding area for metal area. This design allows more metal to be placed where it is needed to carry the flux.

While specific embodiments of the invention have been shown and described in detail to illustrate the application of the principles of the invention, it will be understood that the invention may be embodied otherwise without departing from such principles. Although the invention has hereinabove been described with respect to the illustrated embodiments, it will be understood that the invention is capable of modification and variation and is limited only by the following claims.

I claim:

1. An electrically operated throttle valve assembly comprising:

(a) a throttle body defining an air passage therethrough, said throttle body being connected to a generally cylindrical housing;

(b) a shaft member extending transversely through said passage, said shaft having a valve member thereon, said shaft being journalled in a first and second bearing surface, said first bearing surface and said second bearing surface being disposed on opposite sides of said passage, said shaft member being disposed for rotation therein, wherein said valve member is rotated with said shaft; and said shaft having a portion extending externally of said throttle body;

(c) a hollow generally cylindrical rotor formed of material having a magnetic permeability, said rotor further including a flange with a centrally located bore for receiving said extending portion of said shaft for mounting said rotor thereon and for rotation therewith, said rotor being disposed in an arrangement wherein said flange of said rotor is situated proximate said throttle body, said housing connected to said throttle body concentrically receiving said rotor therein;

(d) a plurality of magnets disposed in the hollow of said rotor in circumferentially spaced arrangement;

(e) a stator formed of a plurality of metal plates attached together, said stator having a plurality of discrete pole segments disposed thereabout, each segment having an electrically conductive coil wound thereon, said stator being encapsulated with a plastic material, and being located in a concentric orientation within said rotor, said plastic material encapsulating said coils wound on said stator and both ends of said stator, said plastic material at one end of said stator forming a rear wall for said housing, said rear wall being constructed for attachment to said housing for supporting said stator therein and facilitating alignment and spacing; and, (f) terminal means connected to each of said electrically conductive coils, said terminal means adapted for external electrical connection thereto.

2. The throttle valve assembly defined in claim 1 wherein said valve member comprises a butterfly plate.

3. The throttle valve assembly defined in claim 1 wherein said plurality of metal plates forming said stator are welded together.

4. The throttle valve assembly defined in claim 3, wherein said welded plurality of metal plates are welded with a weld bead extending on an outside surface thereof.

5. The throttle valve assembly defined in claim 4, wherein said weld bead extends along an apex of an arc on each of the pole segments.

6. The throttle valve assembly defined in claim 1 wherein said plastic material comprises a glass filled nylon material.

7. The throttle valve assembly defined in claim 1, wherein said rear wall of said housing is removable.

* * * * *